May 25, 1943.  E. B. MAILLART  2,320,244
ADJUSTABLE HEADGEAR CONNECTION FOR HELMETS
Filed Dec. 31, 1940
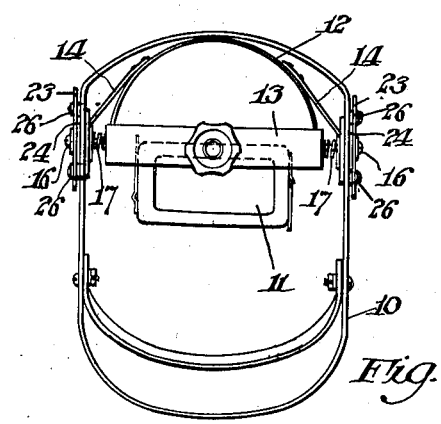
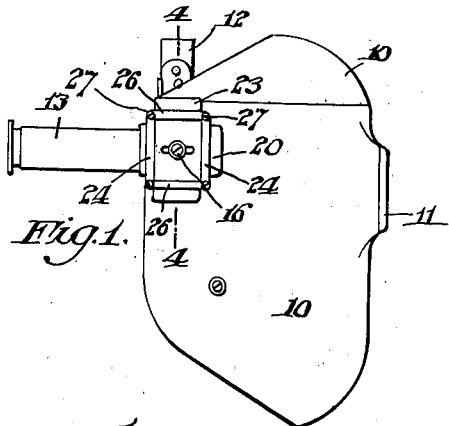
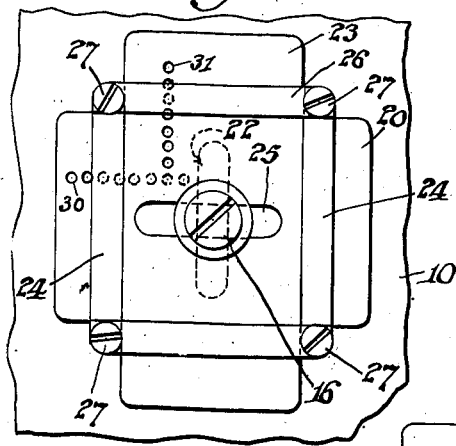
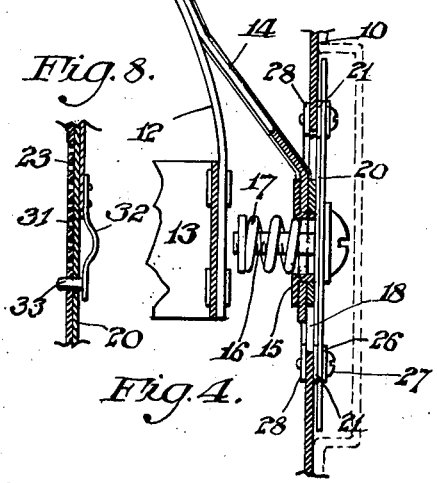
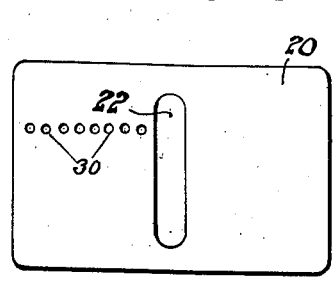
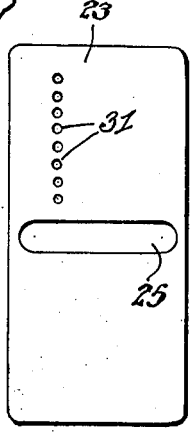
Inventor:
Edmond B. Maillart,
By Barr, Borden & Fox
Attorneys Patented May 25, 1943

2,320,244

UNITED STATES PATENT OFFICE 2,320,244

ADJUSTABLE HEADGEAR CONNECTION FOR HELMETS

Edmond B. Maillart, Media, Pa., assignor to The Fibre-Metal Products Company, Chester, Pa., a firm composed of John W. Bowers and Charles E. Bowers Application December 31, 1940, Serial No. 372,556

5 Claims. (Cl. 2—8)

The present invention relates to helmets or shields for face and head protection and more particularly to the mounting for the head bands of such devices.

By reason of the difference in the size of human heads it has been the general custom to make the supporting head bands of helmets or shields adjustable in order that the device can be fitted properly for use. Such adjustment, however, fails to take into consideration the line of vision with respect to the observation glass. Thus the line of vision may be too high or too low, with respect to the horizontal median line of the glass, for accurate observation. Again the focal distance between the eyes and the plane of the glass may be incorrect for the particular user and impair the efficiency of the operator.

Some of the objects of the present invention are to provide an improved mounting for the head band or bands of a helmet or shield used as a face or head protector; to provide means for correcting the line of vision of an operator using a helmet so that the latter is properly supported for the best results with that particular operator or user; to provide a head band support for helmets which can be adjusted at will to vary the line of vision with the horizontal medial line of the viewing glass; to provide a head band support for helmets which can be adjusted at will to vary the distance between the eyes of the user and the glass; and to provide other improvements as will hereinafter appear.

In the accompanying drawing Fig. 1 represents a side elevation of a helmet or shield equipped with a head adjustment embodying one form of the present invention; Fig. 2 represents a rear elevation of the same; Fig. 3 represents a detail on an enlarged scale of the adjustment unit; Fig. 4 represents a section on line 4—4 of Fig. 1 on an enlarged scale; Figs. 5 and 6 represent respectively the two adjustment plates of Fig. 3 and on the scale of that figurue; Fig. 7 represents a fragmentary elevation showing the inner wall of the shield with a mounting of the adjustment unit; and Fig. 8 represents a section on line 8—8 of Fig. 7.

Referring to the drawing, one form of the present invention is shown as applied to a helmet or shield 10 of any suitable type having a sight opening or window 11 and supporting head bands 12 and 13. As shown, the interconnected bands have arms 14 attached respectively to diametrically opposite sides thereof and outwardly flared to terminate in relative close proximity to the respective inner walls of the helmet 10, where each is pivotally mounted upon an annular bearing 15 carried by a stud bolt 16 under adjustable tension by a coil spring 17. The present invention, however, is not limited to this particular pivot construction as this is shown only by way of example and any suitable pivot or fixed support means may be employed. The two pivots are coaxially alined in order to support the shield 10 symmetrically.

In order that the eyes of the user of the shield can be properly located with respect to the window 11, the axis of the pivotal points must have a definite relation to the horizontal medial line of the window 11. An efficient relation is such that the eyes of the user are in the plane of the horizontal medial line of the window but by reason of different head shapes and sizes and also because of varying angles of observation, such as overhead, close quarters, etc., such a relation cannot be obtained by head band mountings as heretofore constructed. To the end that the adjusting mechanism of the present invention can be properly mounted upon the shield, the sides of the shield are provided with two apertures 18 of such dimensions that the head band pivots 16 can have the required maximum combined vertical and horizontal movements to give the necessary adjustment variations with respect to the window 11. As shown, these apertures 18 are square but obviously such shape is not vital because the requirements are merely to allow unobstructed movement of the pivots within the required range of adjustment.

Since the adjusting units on the two sides of the shield are identical the following description will be limited to one and like parts in the other identified with like reference numerals.

For the purpose of adjusting each pivot bolt 16 horizontally, or at right angles to the vertical plane of the window 11, a plate 20 is provided of generally rectangular shape and mounted for sliding movement between two horizontal guide strips 21. A slot 22 is located substantially centrally of the plate 20 and extends at right angles to the direction of movement of the plate 20 so that movement of the plate 20 in either direction laterally will engage the pivot bolt 16 and shift that part as required.

For the purpose of supporting and adjusting each pivot bolt 16 vertically, or parallel to the plane of the window 11, a plate 23 is provided of generally the same shape and size as the plate 20 and mounted for sliding movement between two vertical guide strips 24. A slot 25 is located substantially centrally of the plate 23 and extends at right angles to the direction of movement of the plate 23, so that movement of the plate 23 in either direction vertically will engage the pivot bolt 16 and shift that part as required. The two plates 20 and 23 are preferably of metal or other stiff material and are positioned one upon another for relative sliding movement, each being guided by a pair of the guide strips. Thus the pair of guide strips 21 lie horizontally and parallel against the face of the shield, while the guide strips 24 lie vertically and parallel against the outer face of the plate 20.

For locking the two plates in a selected adjusted position two locking links 26 are positioned in parallel relation across the outer face of the plate 23, each having apertured ends to receive two fastening screws 27 which pass through the shield and thread into one of a pair of retaining bars 28. These links 26 also prevent the plate 23 from falling out. For simplification in manufacture and assembly the several guide strips 21 and 24 are so apertured and dimensioned as to be supported and held by the same screws 27 as are used for the locking links 26. Thus in outer side elevation the guide strips 24 and locking links 26 form the sides of a rectangle while the two slide plates project sufficiently in all four directions to allow for required adjustments. Also the two slots 22 and 25 are each of such a length as will permit the proper latitude of movement of the pivots 16 for all required adjustments.

Since the adjusting plates and associated parts are preferable of metal, the use of a casing (indicated in dotted lines Fig. 4) made of insulating material is contemplated in order to protect the exposed parts. This casing may be so designed to replace and function as guide strips 21 and 24.

In fitting the shield to the head of a user the fastening screws 27 are so loosened as to permit both of the plates 20 and 23 to move with the required freedom for adjustment. If the head band 13 brings the eyes of the user too close or too far away from the window 11, the plate 20 is shifted in the proper direction to obtain the operating relation between the eyes and the window 11. If the head band 12, as it rests upon the head of the user, brings the eyes below the median line of the window 11, the slide plate 23 is shifted upward to correct this misalinement. On the other hand, if the head band 12 brings the eyes above the window 11, the slide plate 23 is moved downward until the proper relation is obtained. Thus with the two adjustments corrected, the fastening screws 27 are tightened and the two locking links hold the parts in the selected adjusted positions.

An alternative plate locking means may be employed if desired which, in its preferred form, consists of two intersecting rows of holes 30 and 31, one row 30 being in the plate 20 and the other row 31 being in the plate 23. These holes are so spaced that in all adjusted positions of the two plates one hole of one row will register with another hole of the other row. A strip spring 32 is mounted on the helment in such position that a locking pin 33 thereon can enter the two holes in register and thus prevent relative movement between the plates after the adjusted position has been determined. The end of this pin 33 is preferably of rounded contour in order to give under the pressure of a plate be adjusted and thus release one plate with respect to the other until the new position has been reached when the pin springs into locking relation again. When this form of locking means is employed the fastening screws 27 are tightened just enough to retain the parts in place so that the plates are free to move independently thereof when necessary.

While in the foregoing the term "helment" is referred to in many instances this is only by way of example and the invention broadly applies to any type of face protector or shield which is supported in front of the face of the user.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. In combination, a shield having a window and side apertures, a head band, members respectively traversing said apertures for supporting said shield on said head band, two plates carried by each member on the outside of said shield, means for mounting one plate for sliding action parallel to said window, means for mounting the other plate for sliding action substantially at right angles to said window, each pair of plates being juxtaposed and having overlapping angularly divergent slots to receive one of said members for adjustment of said head band relative to said window, each slot being transverse to the movement of the plate in which it is formed, and means for locking said plates together in any selected adjusted position.

2. In combination, a shield having a window and side apertures, a head band, members respectively traversing said apertures for supporting said shield on said head band, two plates carried by each member on the outside of said shield, means for mounting one plate for sliding action parallel to said window, means for mounting the other plate for sliding action substantially at right angles to said window, each pair of plates being juxtaposed and having overlapping angularly divergent slots to receive one of said members for adjustment of said head band relative to said window, each slot being transverse to the movement of the plate in which it is formed, and means including rows of holes in each plate and a spring pressed pin for locking said plates in any selected adjusted position.

3. In combination, a shield having a window and two side apertures, a head band, and a universal adjusting means in association with the respective apertures for attachment of said head band, each of said means consisting of two relatively movable juxtaposed plates slidably mounted on said shield having slots respectively angularly disposed, each pair of slots in transverse overlapped position forming an opening through both plates, each slot being transverse to the line of movement of the plate in which it is formed, and a locking pin traversing each opening to anchor said head band and shield together in any one of a plurality of selected positions of said head band with respect to said window.

4. In combination, a shield having a window and two side apertures, a head band, and adjustable means in association with the respective apertures for attachment of said head band, each of said means consisting of two relatively movable plates arranged side by side on said shield, one of said plates being mounted to slide vertically and the other of said plates being mounted to slide horizontally, the vertically slidable plate having a horizontal slot, and the horizontally slidable plate having a vertical slot, said slots being partially in register in all relative positions of said plates to provide guides respectively for said adjusting means, and a locking pin traversing said slots to anchor said head band and shield together in any one of a plurality of selected positions, whereby the line of vision through said window can be lengthened, shortened and angularly varied at will.

5. In combination, a shield having a window and two side apertures, a head band, and a universal adjusting means in association with the respective apertures for attachment of said head band comprising members secured to said head bands, two pairs of juxtaposed plates disposed across said apertures and provided with transversely disposed overlapping slots for receiving the respective members, means for mounting one plate of each pair to move transversely relative to the length of the slot therein, and means for mounting the other plate of each pair to move transversely relative to the length of the slot therein, whereby the mounting members of the head band are universally adjustable within said apertures in accordance with the relative position of the pair of plates to vary the relation between said head band and said window.

EDMOND B. MAILLART.